United States Patent [19]

Shimoda et al.

[11] Patent Number: 5,997,741

[45] Date of Patent: Dec. 7, 1999

[54] PROCESS FOR PREPARING A POLYETHER ETHER KETONE MEMBRANE

[75] Inventors: Teruyoshi Shimoda; Hiroshi Hachiya, both of Kurashiki, Japan

[73] Assignee: Asahi Kasei Kogyo Kabushiki Kaisha, Osaka, Japan

[21] Appl. No.: 08/836,034

[22] PCT Filed: Dec. 5, 1995

[86] PCT No.: PCT/JP95/02483

§ 371 Date: May 14, 1997

§ 102(e) Date: May 14, 1997

[87] PCT Pub. No.: WO96/17676

PCT Pub. Date: Jun. 13, 1996

[30] Foreign Application Priority Data

Dec. 5, 1994 [JP] Japan .................................. 6-300803

[51] Int. Cl.⁶ .................................................... B01D 39/00
[52] U.S. Cl. ............................... 210/500.27; 210/500.28; 264/41; 264/345
[58] Field of Search .................. 210/500.27, 500.41, 210/500.28, 500.23; 521/180, 61; 528/125; 428/159, 436; 264/45.9, 46.1, 209.1, 209.2, 41, 345

[56] References Cited

U.S. PATENT DOCUMENTS 4,992,485  2/1991  Koo et al. .

*Primary Examiner*—Ana Fortuna
*Attorney, Agent, or Firm*—Birch, Stewart, Kolasch & Birch, LLP

[57] ABSTRACT

The present invention is directed to a process for manufacturing a polyether ether ketone (PEEK) membrane which may be used for ultrafiltration or microfiltration at high temperatures. In this process for manufacturing a non-sulfonated PEEK membrane which comprises dissolving PEEK in a solvent to obtain a membrane forming stock solution, forming the stock solution into a desired shape and bringing the formed stock solution in contact with a coagulating liquid capable of coagulating PEEK, the key features involve using concentrated sulfuric acid as the solvent, dissolving PEEK therein to prepare the stock solution and keeping the stock solution at 15 degrees C or lower until initiation of membrane formation.

13 Claims, No Drawings

PROCESS FOR PREPARING A POLYETHER ETHER KETONE MEMBRANE

TECHNICAL FIELD

The present invention relates to a process for preparing a filtration membrane of polyether ether ketone (hereinafter referred to as PEEK). More particularly, the present invention relates to a wet, sulfuric acid process for preparing a non-sulfonated PEEK filtration membrane which may be used as an ultrafiltration or microfiltration membrane at high temperatures because of its excellence in mechanical strength and heat and chemical resistance, and its low elution characteristics.

BACKGROUND ART

In recent years polymeric separation membranes have widely been used for the preparation of ultrapure water for semiconductors in the electronic industry, the filtration, purification or removal of microorganisms in the medical, pharmaceutical or food industries, or the filtration of industrial waste water, etc., and the current trend is one of continuing expansion in the range and volume of their applications and use. For example, a separation membrane whose ion fractions and organic substances are scarcely eluted and which is excellent in heat and chemical resistance is in demand for the preparation of ultrapure water for the production of semiconductors, while at thermal or nuclear power plants a separation membrane excellent in heat resistance is in strong demand for the stable, longtime filtration of condensed water having temperatures exceeding 100 degrees C. Thus, from the viewpoint of membrane performance the demand for increased heat and chemical resistance is growing.

On the other hand, the materials which have widely been used heretofore for manufacturing separation membranes for ultrafiltration or microfiltration include cellulose derivatives such as cellulose acetate, etc., polyacrylonitrile resins, polyamide resins, polymethyl methacrylate resins, polysulfone resins, polyvinylidene fluoride resins, polyolefin resins, polycarbonate resins and the like. However, because of highly advanced requirements for separation membranes in recent years as mentioned above, these materials have been unsatisfactory with regard to their elution characteristics and the heat resistance and chemical resistance of the membranes made therefrom.

Attention is being paid to PEEK because of its excellent heat resistance, chemical resistance and low elution characteristics, so that this resin has been tried as a material for filtration membranes. For example, JP-A-61-115954 (equivalent to European patent 182506) describes a separation membrane of a sulfonated polyaryl ether ketone and a process for preparing the same. It is however known that such a membrane swells in water (Macromolecules, 86p, 18, 1985) and therefore degrades remarkably in mechanical strength and separation performance, for example, in water of 60 degrees C or higher.

Further, non-sulfonated PEEK membranes have been proposed. For example, JP-A-2-136229 (equivalent to U.S. Pat. No. 4,992,485) proposes a process for preparing a PEEK filtration membrane by using the membrane casting solution prepared by dissolving a specifically structured PEEK in a specific non-sulfonating acid solvent. However, the non-sulfonating acid solvents employed in this process are strong organic acids such as methane sulfonic acid, trichloromethane sulfuric acid, etc., hydrofluoric acid or mixtures of them and concentrated sulfuric acid. They are not only strong in toxicity and corrosiveness but also high in price and therefore are not suited for practical use from a commercial viewpoint. Further, these acids are disadvantageous for practical use because much work is required to make them harmless when they are recovered or disposed of as wastes.

Still further, JP-A-3-56129 (equivalent to European patent 382356) and JP-A-5-192550 (equivalent to EP-A-499381) describe methods of preparing asymmetric polyetherketone resin membranes, but these methods use the aforementioned specific strong acids such as methanesulfonic acid, hydrofluoric acid, etc. as solvents for PEEK.

The acid that may be easily used industrially to dissolve PEEK is concentrated sulfuric acid, which however has not been used in general as a solvent for PEEK because it sulfonates the phenylene groups between the ether groups of PEEK.

SUMMARY OF THE INVENTION

It is an object of the present invention to provide a process for preparing a PEEK filtration membrane which is not only substantially non-sulfonated by using concentrated sulfuric acid, which is easily procured and is inexpensive in the market instead of organic acids or hydrofluoric acid, but is also excellent in mechanical strength and heat and chemical resistance, and has desirably low elution characteristics. The PEEK membrane obtained according to the present invention is useful as an ultrafiltration or microfiltration membrane in fields wherein heat and chemical resistance are necessary.

DETAILED DESCRIPTION OF THE INVENTION

The present invention provides
(1) in a process for preparing a non-sulfonated PEEK membrane which comprises dissolving PEEK in a solvent to obtain a membrane forming stock solution, forming the solution into a desired shape and contacting the formed solution with a coagulation liquid capable of coagulating PEEK, the improvement which comprises:
  (a) using concentrated sulfuric acid as the solvent, and
  (b) after dissolving PEEK in the solvent, maintaining the resulting solution at 15 degrees C or lower until initiation of membrane formation.
(2) the process for preparing a membrane as described in (1), wherein the concentration of concentrated sulfuric acid is 94 percent or more,
(3) the process as described in (1), wherein the membrane forming stock solution contains a thickening agent,
(4) the process as described in (3), wherein the thickening agent is polyvinylpyrrolidone or polyethylene glycol,
(5) the process as described in (1), wherein PEEK is dissolved in the solvent at a temperature of 15 degrees C or lower,
(6) the process as described in (1), wherein the coagulation liquid is water or sulfuric acid having a concentration lower than 70 percent,
(7) the process as described in (1), wherein the coagulation liquid is a water-soluble organic solvent,
(8) the process as described in (6), wherein the coagulation liquid contains a water-soluble organic solvent,
(9) the process as described in (1), wherein after membrane formation the membrane is subjected to heat treatment by using a heat stabilizing solvent under a wet condition at temperatures between the glass transition point and the melting point of PEEK,

(10) the process as described in (9), wherein the temperature of the heat treatment ranges from 150 to 320 degrees C,

(11) the process as described in (9), wherein the solubility parameter of the heat stabilizing solvent ranges from 7 to 17,

(12) the non-sulfonated PEEK membrane obtained in accordance with (1), and

(13) the non-sulfonated PEEK membrane obtained in accordance with (10)

The PEEK membrane obtained according to the process of the present invention retains the heat and chemical resistance that PEEK has intrinsically in spite of using concentrated sulfuric acid which is procurable at low prices and is widely employed in the manufacturing industries. Further, the heat treatment for raising the crystallinity of the said membrane by using a heat stabilizing solvent at a wet condition makes it possible to obtain a heat resistant membrane durable even in water of 130 degrees C or higher.

The membrane of the present invention is prepared in accordance with a wet membrane production process. For example, in the field of polymers such as cellulose, etc., the process has been described by Leob and Sourirajan (see Adv. Chem. Ser. 38, 117, 1963).

The process of the present invention at least comprises the following steps:

(A) dissolving PEEK in concentrated sulfuric acid to prepare a membrane forming stock solution, (B) forming the solution into a desirable shape, (C) coagulating the formed solution in a coagulation liquid, and (D) washing to remove the concentrated sulfuric acid remaining in the resulting PEEK membrane.

First, step (A) will be described hereinafter. PEEK used in accordance with the present invention is composed of the repeating units represented by formulas of Group 1. It may be either a homopolymer comprising the repeating units or a copolymer comprising the repeating units represented by two or more of these formulas. The phenylene groups of the said repeating units may contain lower alkyl groups, halogen groups, nitro groups, nitrile groups, amino groups, phenoxyl groups, phenyl groups, biphenyl groups and substituents represented by the formulas of Group 2.

Group 1

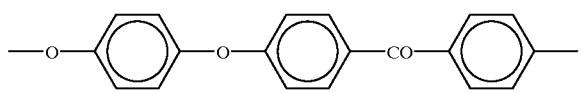

(1)

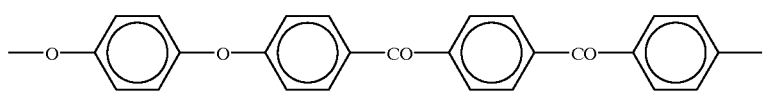

(2)

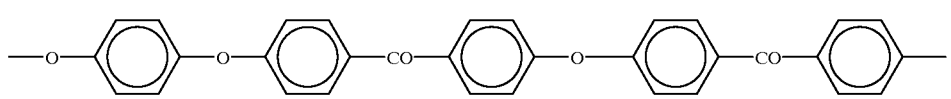

(3)

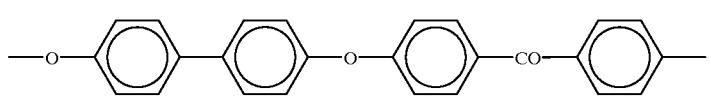

(4)

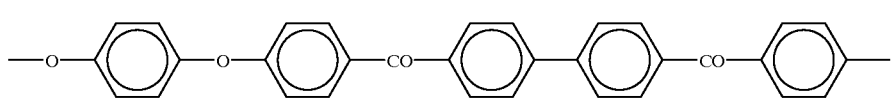

(5)

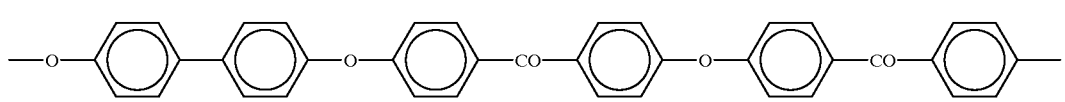

(6)

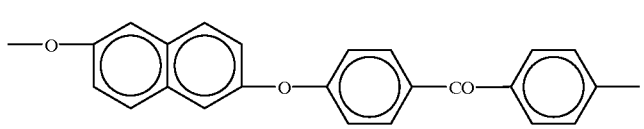

(7)

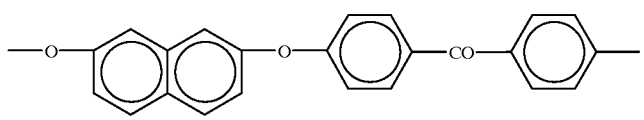

(8)

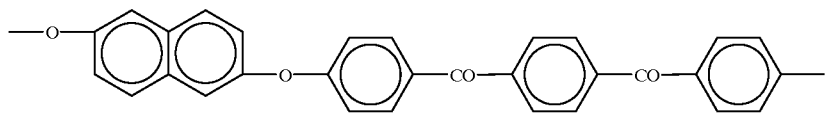
(9)

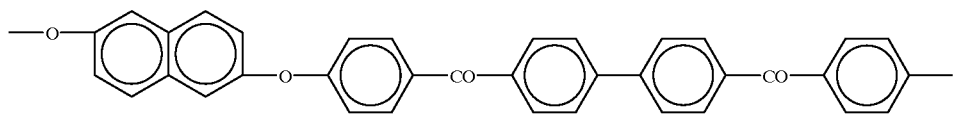
(10)

Group 2

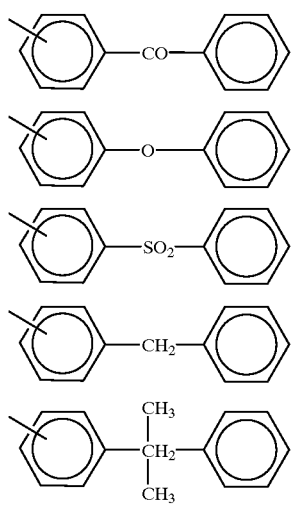

The homopolymers or copolymers comprising the repeating units represented by the formulas of Group 1 may contain as parts thereof, i.e., as copolymeric components, other repeating units, for example, those having structures as represented by the formulas of Group 3, within such quantities as may not remarkably deteriorate the inherent properties of the said homopolymers or copolymers.

Group 3

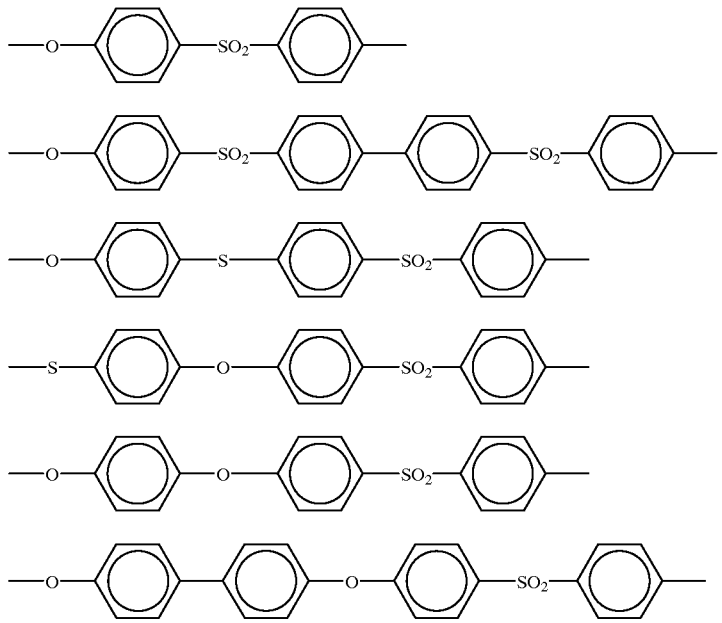

-continued

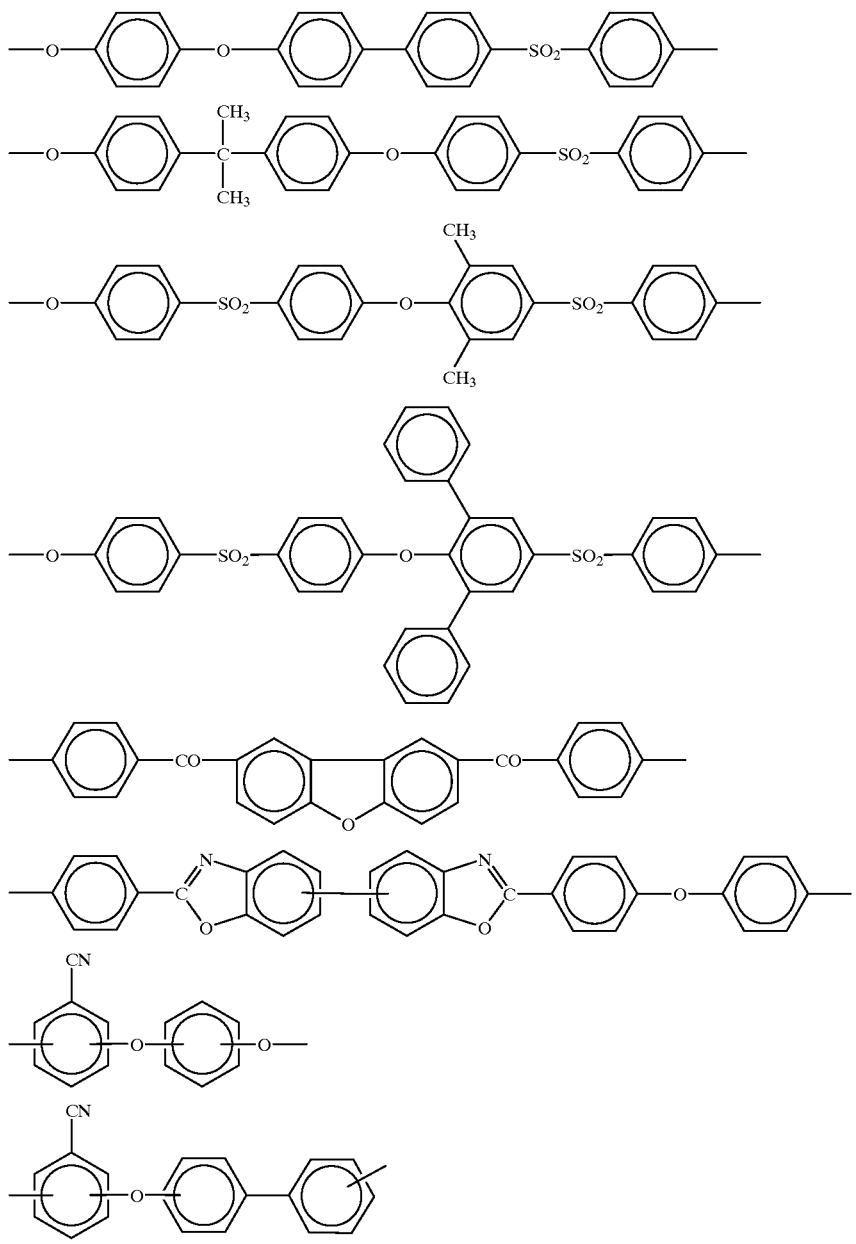

PEEK used in the present invention may be produced by known polymerization methods. As an example thereof, there may be mentioned a method of condensation polymerizing an aromatic dihalogen compound and a diphenol in the presence of an alkali salt. The said polymerization method is described in JP-B-57-22938, U.S. Pat. Nos. 4,113,699 and 4,320,224 and JP-A-54-90296. The polymerization degree of PEEK used in the present invention is not particularly limited. The polymerization degree of PEEK is expressed as reduced viscosity obtained from measurements at 25 degrees C with an Ostwald viscometer of a 0.1 percent PEEK solution (PEEK weight/concentrated sulfuric acid volume), the solvent being concentrated sulfuric acid having a density of 1.83g/cm$^3$. The measurement should be performed in the vicinity of 25 degrees C immediately after PEEK is dissolved in order to minimize the influence of sulfonation. The viscometer of ca. two minute solvent efflux time is used in the measurement. The reduced viscosity of PEEK used in the present invention is ordinarily in the range of 0.5 to 2.5 dl/g. In order to obtain high mechanical strength of the resulting membrane, it is preferred that the reduced viscosity is in the range of 0.8 to 2.5 dl/g.

Furthermore, the particle size of PEEK used according to the present invention is not especially restricted, but the smaller the better to accelerate the dissolving rate thereof against concentrated sulfuric acid. For example, the particle size of PEEK is 5 mm or smaller, preferably 1 mm or smaller and more preferably 0.5 mm or smaller. PEEK may be used in the form of pulverulent bodies obtained by polymerization or smaller particles obtained by grinding pellets thereof.

According to the present invention, concentrated sulfuric acid refers to that having a concentration of at least 85 percent or oleum. When PEEK of especially higher molecular weight is dissolved or when the PEEK concentration is raised in a membrane forming stock solution, it is preferred to raise the concentration of concentrated sulfuric acid to 90 percent or more. When the PEEK concentration is further raised in the membrane forming stock solution or when the membrane forming stock solution contains an additive, thickening agent or the like, the concentration of concentrated sulfuric acid is preferably at least 94 percent, particularly preferably at least 98 percent in order to raise the dissolvability of PEEK, the additive, thickening agent and the like. According to the present invention, the concentration of sulfuric acid is expressed as percent by weight of the concentrated sulfuric acid content when 100 percent concentrated sulfuric acid is diluted with water.

According to the present invention, the temperature and time required to dissolve PEEK in concentrated sulfuric acid are not especially restricted if the ion exchange capacity of the resulting PEEK filtration membrane is in the range of 0 to 0.5 meq./g. The temperature depends upon the molecular weight of PEEK, the PEEK concentration of the membrane forming stock solution and the concentration of concentrated sulfuric acid, but should normally be within the range that may keep the membrane forming stock solution in a liquid state. The time necessary to completely dissolve PEEK ordinarily ranges from 3 to 100 hours. Especially, the temperature while dissolving PEEK is preferably 15 degrees C or lower, more preferably 10 degrees C or lower. Further, in step (A), deaeration may be performed under vacuum in the course of dissolving PEEK or immediately after PEEK is dissolved.

According to the present invention, an inorganic compound, lower molecular weight organic compound or the like may be added as an additive to the aforesaid membrane making stock solution to control the pore size of the resulting membrane. As inorganic compounds, various salts may be used, while as lower molecular weight organic compounds, compounds having a molecular weight of 1,000 or lower may be preferably used. As such lower molecular weight compounds, listed are diphenylsulfone, 4,4'-dichlorodiphenylsulfone, 2,4'-dichlorodiphenylsulfone, 4,4,'-difluorodiphenylsulfone, 2,4'-difluorodiphenylsulfone, 2,2'-difluorodiphenylsulfone, benzophenone, 4,4'-dichlorobenzophenone, 2,4'-dichlorobenzophenone, 4,4'-difluorobenzophenone, 2,4'-difluorobenzophenone, 2,2'-difluorobenzophenone, 4,4'-difluoroterephthalophenone, 2,4'-difluoroterephthalophenone, 4,4'-dichloroterephthalophenone, 2,4'-dichloroterephthalophenone, N,N-dimethylformamide, N,N-dimethylacetoamide, dimethylsulfoxide, N-methylpyrrolidone, xanthone, terephthalic acid, isophthalic acid, salicylic acid, halogenated hydrocarbons, 1,4-butanediol, 1,3-butanediol, ethyleneglycol, diethyleneglycol, triethyleneglycol, tetraethyleneglycol, ethyleneglycol monomethylether, diethyleneglycol monomethylether, triethyleneglycol monomethylether, tetra-ethyleneglycol monomethylether, ethyleneglycol dimethylether, diethyleneglycol dimethylether, triethyleneglycol dimethylether, tetraethyleneglycol dimethylether, ethyleneglycol monoethylether, diethyleneglycol monoethylether, triethyleneglycol monoethylether, tetraethyleneglycol monomethylether, ethyleneglycol diethylether, diethyleneglycol dimethylether, triethyleneglycol diethylether, tetraethyleneglycol dimethylether, ethyleneglycol monoisopropylether, diethyleneglycol monoisopropylether, triethyleneglycol monoisopropylether, tetraethyleneglycol monoisopropylether, propyleneglycol monoisopropylether, ethyleneglycol diisopropylether, diethyleneglycol diisopropylether, triethyleneglycol diisopropylether, tetraethyleneglycol diisopropylether, ethyleneglycolmonophenylether, diethyleneglycol monophenylether, triethyleneglycol monophenylether, tetraethyleneglycol monophenylether, ethyleneglycoldiphenylether, diethyleneglycol diphenylether, triethyleneglycol diphenylether, tetraethyleneglycol diphenylether, dichloroacetic acid, trichloroacetic acid, difluoroacetic acid, trifluoroacetic acid, methanesulfonic acid, chloromethanesulfonic acid, dichloromethanesulfonic acid, trichloromethanesulfonic acid, fluoromethanesulfonic acid, difluoromethanesulfonic acid, trifluoromethanesulfonic acid, glycerol and the like. It is preferred that they are uniformly dissolved in the membrane forming stock solution. They may be dispersed in a microfine state or modified to such an extent so as not to have any bad effect on the performance of the resulting membrane.

Furthermore, a thickening agent such as a water-soluble or water-insoluble inorganic compound or high molecular weight organic compound, oligomer thereof or the like may be added for the purpose of controlling the viscosity of the above-mentioned membrane forming stock solution. Examples of the inorganic compounds include utrafine silica and the like which give a thixotropic property to the membrane forming stock solution and examples of the high molecular weight organic compounds include polyvinylpyrrolidone, polyethyleneglycol, polyethyleneglycolmonoalkylethers, polyethyleneglycoldialkylethers, sulfonated polyetherketone, polysiloxane, polyethersulfone, polysulfone, polyetherimide, etc., mixtures thereof and oligomers thereof. Among them, polyvinylpyrrolidone or polyethyleneglycol is preferably used. These thickening agents may be modified in the membrane forming stock solution to such an extent that they do not affect the performance of the resulting membrane.

The component ratios of the membrane forming stock solution used in the instant invention are not especially limited if respective components are dissolved uniformly therein. Normally, the membrane forming stock solution of the present invention comprises 5–20 parts by weight of PEEK, 30–95 parts by weight of concentrated sulfuric acid, 0–20 parts by weight of an additive and 0–60 parts by weight of a thickening agent per 100 parts by weight of the stock solution. The amount of said additive is less than 40 percent by weight based on the weight of concentrated sulfuric acid used therein. The viscosity of the stock solution thus prepared according to the aforesaid component ratios and used in the instant invention ranges from 50 to 1,000 poise at a temperature of 15 degrees C.

In step (A) of the instant invention, it is preferred that agitation is carried out in a closed system to prevent the component ratios from changing because of the hygroscopic property of concentrated sulfuric acid. In this case, the membrane forming stock solution is prepared under vacuum or in the presence of a water vapor-free gas such as dried nitrogen gas. On the other hand, the hygroscopicity of concentrated sulfuric acid may be controlled by adjusting the humidity in the atmosphere of the membrane forming stock solution and as a result, this makes it possible to adjust the water content of the stock solution.

It is preferred that the state of the membrane forming stock solution used in the present invention is one which is in the neighborhood of microphase separation. If the stock solution is in such a state, the resulting filtration membrane tends to increase in water permeability. By the term "microphase separation" mentioned in the present invention is meant a suspended state in which a polymer rich phase of the stock solution has been separated from a polymer poor phase by the addition of water in extremely small increments to the prepared stock solution, with one of the phases being dispersed as microfine particles in the other phase. Particularly, the neighborhood of the microphase separation refers to the concentrative composition of the stock solution which may undergo the said microphase separation when 0.01–3 parts by weight, preferably 0.05–2 parts by weight of water, is added to 100 parts by weight of the stock solution at a membrane formation temperature. Therefore, for the purpose of making the stock solution one which is in the neighborhood of the microphase separation it is important to accurately control the ratio of each of the components such as the concentrated sulfuric acid, additive, thickening agent, and the like.

Following step (A), step (B) of forming the membrane forming stock solution into a desirable shape and step (C) of coagulating the shaped membrane forming stock solution in a coagulation liquid proceed in order.

According to the present invention, it is necessary to cool the membrane forming stock solution immediately after step (A) and to keep the temperature of the stock solution at 15 degrees C or lower until the beginning of membrane formation. This temperature also refers to that of the piping and tanks in which the stock solution is detained or stored in the course of membrane formation and is preferably 10 degrees C or lower and more preferably 6 degrees C or lower. The temperature of the stock solution has a great influence on the sulfonation, mechanical strength and chemical resistance of the filtration membrane obtained according to the present invention.

The membrane forming stock solution may be deaerated between steps (A) and (B). The method of deaeration is not especially restricted, but the deaeration is carried out generally under vacuum or by means of centrifugal separation. In general, there is the possibility that the resulting filtration membrane will have pinholes if the deaeration step is omitted.

According to the present invention, the form of the membrane obtained in step (B) is that of a flat-sheet, hollow fiber, tubular and capillary membrane, though the form is not especially limited. Examples of methods for forming a flat-sheet membrane include application of the membrane forming stock solution to a support and the consecutive immersion thereof in a coagulation liquid, extrusion of the membrane forming stock solution through a slit die into a coagulation liquid, and the like. Examples of the supports not attacked immediately by concentrated sulfuric acid include sheets of stainless steel, polyethylene, polypropylene, polytetrafluoroethylene, glass and the like. To obtain tubular, hollow fiber or capillary membranes, a coaxial double-tube die is used, through an annular orifice of which a membrane forming stock solution is extruded and through the bore of which a liquid such as a good solvent or non-solvent for the PEEK or an inert gas as a bore coagulant is passed, and the stock solution thus extruded is immersed in a coagulation liquid.

The thickness of the PEEK membrane obtained in the instant invention is not particularly limited but ranges normally from 5 to 10,000 $\mu$m. Particularly, if the form of the membrane is that of a hollow fiber membrane, a membrane with a wall thickness ranging from 5 to 2,000 $\mu$m and an inside diameter ranging from 10 to 5,000 $\mu$m may be produced preferably but the thickness and inside diameter are not especially limited.

Furthermore, according to the present invention, it is possible to obtain a composite membrane which may be produced by flow casting a membrane forming stock solution on a porous fabric substrate and coagulating it integrally. Examples of materials for the porous substrates normally include fabrics of polyethylene, polypropylene, polytetrafluoroethylene, polyester, PEEK, polyether ketone (PEK), polyphenylenesulfide, carbon fiber and glass fiber.

In step (B), the temperature of the membrane forming stock solution is ordinarily 80 degrees C or lower and falls within a range where the solution is in a liquid state. For example, if the membrane forming stock solution is formed into a flat-sheet membrane or hollow fiber membrane by use of a flat slit die or a coaxial double-tube die, the temperature of the stock solution may be adjusted by controlling the temperature of the said dies so that it may be within the above-mentioned temperature range. In this case, the temperature of the piping and tanks wherein the stock solution is detained or stored is, of course, 15 degrees C or lower as mentioned hereinbefore.

The coagulation liquids used in step (c), are sufficient if they are capable of coagulating PEEK and are mixable with concentrated sulfuric acid and for example, include water, dilute sulfuric acid, acetic acid, acetic acid ester, alcohols, polyhydric alcohols, monoalkylethers of glycols, dialkylethers of glycols, ketones, polymer-containing solutions, and mixtures thereof. Further, inorganic salts or bases may be added to the coagulation liquids. As the inorganic salts, preferably used are, for example, lithium chloride, sodium chloride, calcium chloride, magnesium chloride, ammonium chloride, ammonium nitrate, lithium sulfate, magnesium perchlorate, sodium perchlorate, sodium hypochlorite, sodium hydroxide, potassium hydroxide, sodium carbonate, potassium carbonate, potassium hydrogen carbonate and the like.

Particularly if a coagulation liquid highly capable of coagulating the membrane forming stock solution is used, a membrane having high fractionating characteristics tends to be preferably obtained. Such coagulation liquids are, for example, water and sulfuric acid having a concentration of less than 70 percent.

If a coagulation liquid low in the capability of coagulating the membrane forming stock solution is used, a highly water-permeable membrane tends to be obtained.

Coagulability may be adjusted by using a water-soluble organic solvent, a mixture of a water-soluble organic solvent and water, a mixture of a strong acid and water, a mixture of a strong acid and a water-soluble organic solvent or the like as a coagulation liquid.

The surface of the formed stock solution may be contacted with the vapor of a non-solvent against PEEK immediately before the said solution is immersed in the coagulation liquid.

Particularly, if the form of the membrane is that of a tube, hollow fiber or capillary tube, bore coagulants similar to the aforesaid coagulation liquids may be used and they may be the same as or different from the coagulation liquids. Various inert gases may be used as the bore coagulants.

If the temperature of the membrane forming stock solution is within a range where PEEK may not be substantially sulfonated during membrane formation, the said temperature is not especially limited but is normally in the range of the freezing point of the stock solution to 80 degrees C. If the stock solution is formed by use of a slit die or coaxial double-tube die, the temperature of the stock solution during membrane formation may be controlled by heating the said die. If the temperature of the solution is, for example, 15 degrees C or higher, it is preferred to shorten its detention time in the die to minimize the sulfonation of PEEK.

Further, the range of −10 to 90 degrees C that does not sulfonate PEEK substantially may be adopted as the temperature of the coagulation liquids and the bore coagulants used for forming a hollow fiber membrane.

According to the present invention, the shaped membrane forming stock solution may be stretched when or after it is coagulated, if necessary.

Step (C) is followed by Step (D) in which residual sulfuric acid is washed away from the resulting PEEK filtration membrane. Further, in step (D), the additive, thickening agent and coagulation liquid which are used in the membrane forming stock solution are also removed from the resulting PEEK filtration membrane in addition to the removal of the residual sulfuric acid. However, step (D) may be omitted if the residual sulfuric acid, additive and thickening agent are removed before step (D) to such an extent that problems do not occur in the heat treatment discussed hereinafter or in the use of the resulting filtration membrane.

In step (D), the residual sulfuric acid and other components are removed, for example, by means of the washing treatment wherein an aqueous solvent or a solvent mostly consisting of water is used as a washing solvent at temperatures within the range between 5 degrees C and the boiling point of water. Normally, water or an alkaline water is used preferably. Particularly, if the form of the PEEK filtration membrane is that of a tube, hollow fiber or capillary tube, it is also effective to pass the said washing solvent through its bore.

If a small amount of sulfuric acid still remains in the said membrane after step (D), it may be further rinsed with an organic solvent. As the organic solvents, normally used are methanol, ethanol, propanol, acetone, methylethylketone, ethylene glycol, diethylene glycol, triethylene glycol, dimethylformamide, dimethylacetamide, N-methyl-2-pyrrolidone, etc. For example, the range of −5 to 120 degrees C may be adopted as the temperatures of the said organic solvents. If thickening agents or additives insoluble to aqueous solvents are used in step (A), the above-mentioned organic solvents are preferable for washing and removing. Further, if polyvinyl pyrrolidone is used as a thickening agent in step (A), residual polyvinyl pyrrolidone may be decomposed, removed and rinsed with an aqueous solution of a hypochlorite such as sodium hypochlorite or the like, for example, after the above-mentioned washing is performed. In this case, decomposition, removal and rinse may be performed normally with an aqueous solution of a 100–80,000 ppm hypochlorite at temperatures of 5–95 degrees C for 1–500 hours. It is also effective to make the resulting PEEK filtration membrane sufficiently hydrophilic in advance by immersing it in an aqueous organic solution such as ethanol or the like.

After step (D), it is preferred to preserve the PEEK membrane from being dried, i.e., under the condition of immersing the membrane in water, an alcohol, an aqueous solution of an alcohol, formalin or a mixture thereof, or under the condition of impregnating an aqueous solvent thereof into the inside and the surface of the membrane. A preferred way of preservation is to immerse the membrane in formalin in or to impregnate it with an alcohol such as ethylene glycol, diethylene glycol, triethylene glycol, tetraethylene glycol, propylene glycol, dipropylene glycol, tripropylene glycol, low molecular weight polyethylene glycol, glycerol or the like or a mixture thereof. If the PEEK membrane is dried after step (D), its water permeability tends to be lowered, which is not preferred.

In accordance with the present invention, it is preferred to subject the membrane to heat treatment after the above-mentioned rinse step by using a heat stabilizing solvent under a wet condition at temperatures between the glass transition and melting points of PEEK. The temperature of the heat treatment ranges preferably from the glass transition point plus 20 degrees C to the melting point minus 20 degrees C of PEEK and more preferably from the glass transition point plus 50 degrees C to the melting point minus 50 degrees C. For example, if PEEK is composed of the repeating units represented by formula (1) of Group 1, the temperature of the heat treatment ranges preferably from 150 to 320 degrees C and more preferably from 200 to 280 degrees C. The glass transition and melting points of PEEK mentioned in the present invention mean those obtained by measuring with a differential thermal analyzer while raising the temperature at a rate of 10 degrees C/min.

In accordance with the instant invention, the PEEK membrane is maintained under the wet condition during the heat treatment by use of a heat stabilizing solvent. The heat stabilizing solvents mentioned in the present invention mean those that are used for the heat treatment to increase the crystallinity of the PEEK membrane and maintain the membrane in the wet condition during the treatment. Further, the wet condition mentioned in the present invention refers to the condition wherein the said membrane is wet with the heat stabilizing solvent used for the heat treatment. In more detail, it refers to the condition wherein the membrane is wet from its surface to the inside with the heat stabilizing solvent or the like that may bring about the wet condition or the condition wherein the membrane is wholly immersed in the said solvent. The condition is attained by applying or atomizing the solvent to the surface of the PEEK membrane, impregnating the solvent into the membrane or immersing the membrane in the said solvent. For example, a desirable wet condition according to the instant invention is the condition wherein the said solvent is uniformly applied to or impregnated into the PEEK membrane 0.5 time or more, preferably 2 times or more, more preferably 10 times or more based on the weight of the PEEK membrane, although depending upon the porosity of the PEEK membrane and the specific gravity of the solvent used for obtaining the wet condition.

The heat stabilizing solvents used for the heat treatment of the present invention are not limited to specific ones if they are solvents that do not dissolve the PEEK membrane and that are stable during the said treatment. Of them, the solvents with solubility parameters of 7 to 17 are used preferably. The solvents having solubility parameters ranging more preferably from 7 to 15, particularly preferably from 8 to 13 are used. If a heat stabilizing solvent outside the above ranges is used, the water permeability of the resulting PEEK membrane is remarkably lowered.

The solubility parameter according to the instant invention is denoted by the following formula:

$$\text{solubility parameter} = (\Delta E_v/V)^{1/2}$$

wherein $\Delta E_v$ is molar evaporation energy, nearly equal to $\Delta H - RT$ wherein $\Delta H$ is vapor heat, R is the gas constant and T is absolute temperature, and V is the molar volume of a solvent.

Solubility parameters are described in many scientific literatures and books. Particularly, "Polymer Data Handbook, Basic Edition", compiled by The Society of Polymer Science, Japan and published by Baifukan Co., Ltd. has tables on solubility parameters by solvent, so that a decision may be made on the choice of the heat stabilizing solvents suitable for the instant invention.

Other literatures giving considerations to solubility parameters include Ind. Chem. Prod. Res. Dev. 8, Mar. 1969, p.2–11, Chemical Reviews, 75(1975), p.731–753, and Encyclopedia of Chemical Technology, 2nd Edition, Supplement Volume (1971), p.889–910.

Examples of the heat stabilizing solvents used according to the present invention include alcohols such as methanol, ethanol, n-propanol, n-butanol, isobutanol, sec-butyl alcohol, t-butyl alcohol, n-pentanol, n-hexanol, 2-ethylbutanol, n-octanol, ethyl hexanol, 1-dodecanol, 3,5,5,-trimethyl hexanol, cylohexanol, methyl isobutylcarbinol, n-amyl alcohol, allyl alcohol, lauryl alcohol, benzyl alcohol, furfuryl alcohol, n-heptanol, 1,4-butanediol, 1,3-butanediol, 2,3-butanediol, ethylene glycol, diethylene glycol, triethylene glycol, tetraethylene glycol, propylene glycol, dipropylene glycol, tripropylene glycol, tetraethylene glycol, neophenyl glycol, 1,5-pentanediol, 2,4-pentanediol, 2,5-pentanediol, glycerol, polyethylene glycol, polypropylene glycol and the like, ethers such as dimethyl ether, diethyl ether, ethyl methyl ether, isopropyl ether, dipropyl ether, diisopropyl ether, butyl ether, dibenzyl ether, dihexyl ether, diamyl ether, ethyl isobutyl ether, methylisobutyl ether, diacetone alcohol methyl ether, dichloroethyl ether, diphenyl ether, ethyleneglycol monomethyl ether, diethyleneglycol monomethyl ether, triethyleneglycol monomethyl ether, tetraethyleneglycol monomethyl ether, propyleneglycol monomethyl ether, ethyleneglycol dimethyl ether, diethyleneglycol dimethyl ether, triethyleneglycol dimethyl ether, tetraethyleneglycol dimethyl ether, propyleneglycol dimethyl ether, ethyleneglycol monoethyl ether, diethyleneglycol monoethyl ether, triethyleneglycol monoethyl ether, tetraethylene glycol monomethyl ether, propyleneglycol monoethyl ether, ethyleneglycol diethyl ether, diethyleneglycol dimethyl ether, triethyleneglycol diethyl ether, tetraethyleneglycol dimethyl ether, propyleneglycol diethyl ether, ethyleneglycol monoisopropyl ether, diethyleneglycol monoisopropyl ether, triethyleneglycol monoisopropyl ether, tetraethyleneglycol monoisopropyl ether, propyleneglycol monoisopropyl ether, ethyleneglycol diisopropyl ether, diethyleneglycol diisopropyl ether, triethyleneglycol diisopropyl ether, tetraethyleneglycol diisopropyl ether, propyleneglycol diisopropyl ether, ethyleneglycol monophenyl ether, diethyleneglycol monophenyl ether, triethyleneglycol monophenyl ether, tetraethyleneglycol monophenyl ether, propyleneglycol monophenyl ether, ethyleneglycol diphenyl ether, diethyleneglycol diphenyl ether, triethyleneglycol diphenyl ether, tetraethyleneglycol diphenyl ether, propyleneglycol diphenyl ether, methyl-2-pentanediol-1,3-methyl-2-pentanediol-2,4, ethylhexanediol-1,3 and the like, acetals such as 1,4-dioxane, furan, furfural, tetrahydrofuran and the like, esters such as methyl acetate, ethyl acetate, n-propyl acetate, isopropyl acetate, n-butyl acetate, isobutyl acetate, sec-butyl acetate, n-amyl acetate, isoamyl acetate, sec-amyl acetate, vinyl acetate, allyl acetate, methylamyl acetate, butyl stearate, methyl formate, ethyl formate, propyl formate, n-butyl formate, isobutyl formate, n-amyl formate, isoamyl formate, methyl butyrate, ethyl butyrate, isobutyl butyrate, n-butyl butyrate, propyl butyrate, isopropyl isobutyrate, methyl propionate, ethyl propionate, butyl propionate, propyl propionate, ethyl lactate, methyl lactate, n-butyl lactate, methyl benzoate, ethyl benzoate, ethyl acrylate, methyl acrylate, methyl methacrylate, ethyl methacrylate, butyl methacrylate, methyl isobutyrate, ethyl isobutyrate, dimethyl phthalate, diethyl phthalate, dipropyl phthalate, dibutyl phthalate, dimethyl oxalate, diethyl oxalate, dimethyl sebacate, diethyl sebacate, dibutyl sebacate, dioctyl sebacate, butyrolactone, caprolactone, methyl caprolactone, propiolactone, dioctyl phthalate and the like, ketones such as acetone, methyl ethyl ketone, methyl propyl kentone, methyl n-butyl ketone, methyl amyl ketone, diethyl ketone, diisobutyl ketone, diisopropyl ketone, methyl isoamyl ketone, ethyl amyl ketone, methyl isobutyl ketone, methyl isopropyl ketone, methyl nonyl ketone, cyclopentanone, cyclobutanedione, methylcyclohexanone, acetophenone, diacetone alcohol, mesityl oxide, acrolein, benzophenone, chlorobenzophenone, dichlorobenzophenone, difluorobenzophenone, fluorobenzophenone, hydroxybenzophenone, dihydroxybenzophenone, difluoroterephthalophenone, dichloroterephthalophenone, dihydroxyterephthalophenone and the like, aldehydes such as acetaldehyde, benzaldehyde, butylaldehyde and the like, hydrocarbons such as hexane, heptane, octane, cyclohexane, decane, methyl cyclohexane, tetrahydronaphthalene, benzene, toluene, xylene, styrene, ethyl benzene, n-propyl benzene, cyclopentane and the like, halogenated hydrocarbons such as methyl chloride, methylene chloride, trichloromethane, carbon tetrachloride, ethyl chloride, ethylidene chloride, methyl iodide, ethyl iodide, benzene iodide, bromobenzene, chlorobenzene, dichlorobenzene, trichlorobenzene and the like, fatty acids and phenols such as formic acid, acetic acid, butyric acid, maleic acid, propionic acid, acetic anhydride, propionic anhydride, succinic anhydride, maleic anhydride, acrylic acid, methacrylic acid, phenol, m-cresol, bisphenol A and the like, nitrogen compounds such as nitromethane, nitroethane, nitropropane, nitrooctane, nitrobenzene, methylamine, ethylamine, diethylamine, triethylamine, butylamine, dibutylamine, tributylamine, amylamine, ethylenediamine, N,N-dimethyl nitroamine, triethylene tetramine, formamide, N-methyl formamide, N-ethyl formamide, methyl acetamide, N-ethyl acetamide, N,N-dimethyl formamide, N,N-dimethylacetamide, N,N-diethyl acetamide, tetramethyl oxyamide, hexamethyl phosphorylamide, aniline, dimethyl aniline, acetonitrile, chloroacetonitrile, n-butyronitrile, benzonitrile, capronitrile, propionitrile, acrylonitrile, malononitrile, n-valeronitrile, quinoline, morpholine, N-ethyl morpholine, N-acetyl morpholine, N-formyl morpholine, α-pyrrolidone, N-methyl-2-pyrrolidone, pyridine, piperidine, N-acetyl piperidine, N-formyl piperidine, N-acetyl piperidine, N,N-diacetyl piperazine, hydrazine, phenyl hydrazine, ε-caprolactam and the like, carbonates such as dimethyl carbonate, diethyl carbonate, methyl ethyl carbonate, diphenyl carbonate, methyl phenyl carbonate, ethyl phenyl carbonate and the like, sulfur compounds such as methyl ethyl sulfone, tetramethylene sulfone, dimethyl sulfide, carbon disulfide, methyl tetramethylene sulfone, methyl propyl sulfone, dimethyl sulfone, dimethyl sulfoxide, dimethyl tetramethylene sulfone, diethyl sulfone, sulfolane, thiophene, dipropyl sulfone, diphenyl sulfone, difluorodiphenyl sulfone, dichlorodiphenyl sulfone, dihydroxydiphenyl sulfone and the like, phosphorus compounds such as dibutylphenyl phosphate, tricresyl phosphate, triphenyl phosphite, hexamethylphosphoric triamide and the like, and mixtures thereof.

Of the aforesaid heat stabilizing solvents, particularly preferred for use are 1,4-butanediol, 1,3-butanediol, ethylene glycol, diethylene glycol, triethylene glycol, tetraethylene glycol, propylene glycol, dipropylene glycol, tripropylene glycol, glycerol, polyethylene glycol, polypropylene glycol, N,N-dimethyl formamide, N,N-dimethyl acetamide, N-methyl-2-pyrrolidone and mixtures thereof. If polyethylene glycol or polypropylene glycol is used as a heat stabilizing solvent according to the instant invention, each weight average molecular weight is not particularly limited but ranges preferably from 100 to 2,000.

The time necessary for the heat treatment of the instant invention is not especially restricted but is in the range of preferably 30 seconds to 100 hours, more preferably 1 minute to 50 hours, still more preferably 1 minute to 2 hours.

If the PEEK membrane is under the wet condition of being immersed in a heat stabilizing solvent, the heat treatment of the present invention may be carried out in an open system or in a closed system wherein an autoclave or the like is used, while if the PEEK membrane is in the wet condition of applying a heat stabilizing solvent thereto or impregnating the solvent thereinto, the heat treatment may be performed in an open system by use of an oven or the like or in a closed system by use of an autoclave or the like. However, in the open system, the PEEK membrane is in some cases deformed or damaged on its surface because of the intense evaporation of the heat stabilizing solvent during the heat treatment. Therefore, in the open system in which an oven or the like is used, attention must be paid so that the PEEK membrane may not deviate from the wet condition owing to the evaporation of the heat stabilizing solvent.

Furthermore, when the heat treatment of the present invention is performed, the atmosphere of the heat stabilizing solvent may be the air or an inert gas such as nitrogen, argon, helium or the like. If oxygen in the air has such an influence that it degrades the water permeability or fractionating characteristics of the resulting PEEK filtration membrane because oxygen deteriorates the heat stabilizing solvent during the heat treatment, it is preferred that the heat treatment is carried out under an inert gas.

If the heat treatment follows step (D) consecutively, it is effective that residual low boiling point solvents such as coagulation liquids, rinse solvents, etc. are removed from the PEEK filtration membrane prior to the said treatment. Further, it is preferred that the low boiling point solvents remaining in the PEEK filtration membrane after step (D) are substituted by a portion of the heat stabilizing solvent to be used in the heat treatment. If the said low boiling point solvents remain in the surface or inner regions of the membrane at the time of the heat treatment, it is undesirable that the semipermeable membrane is deformed or damaged in some cases on account of the boiling of the residual low boiling point solvents.

Furthermore, if the heat treatment is performed consecutively following step (D), the PEEK filtration membrane may be impregnated with a high molecular weight compound as treatment prior to the heat treatment according to necessity. This tends to result in a smaller difference between the water permeability of the said membrane before and after the heat treatment.

Any of the said high molecular weight compounds may be used without particular restriction if it does not decompose at temperatures not lower than the glass transition point of PEEK and particularly at the temperatures of the heat treatment to be performed thereafter, has no chemical influence on PEEK and further can be removed from the PEEK filtration membrane with a solvent after the heat treatment.

If the heat treatment is carried out according to the instant invention, the residual heat stabilizing solvent used for the heat treatment is normally removed by rinsing after the heat treatment. As the said rinse solvent, water or an organic solvent such as an alcohol, acetone or the like is used preferably and the temperature for rinsing is in the range between 5 and 120 degrees C. However, it is undesirable that the deformation of the PEEK membrane and the damage of its surface tend to take place if the rinse solvent for removing the residual heat stabilizing solvent boils under reflux or the like. The rinse step for washing away the residual heat stabilizing solvent may be omitted, if there is no problem with the solvent in using the PEEK membrane as a separation membrane.

If the PEEK membrane dries in its inner regions and on its surface even after the heat treatment of the present invention, the aforesaid preservation method may be effectively applied thereto because the water permeability tends to be lowered.

The PEEK membrane of the present invention has an ion exchange capacity of 0 to 0.5 meq/g. Especially, in order to enhance its heat and chemical resistance, the ion exchange capacity should range preferably from 0.005 to 0.3 meq/g and more preferably from 0.005 to 0.2 meq/g. To enhance its hydrophilic property and fouling resistance, it is preferred that the ion exchange capacity is in the range of 0.1 to 0.5 meq/g.

The aforesaid heat treatment enhances the crystallinity of the PEEK membrane prepared according to the instant invention and as a result, may further improve the heat and chemical resistance thereof. If the heat and chemical resistance are required at a temperature exceeding 100 degrees C, the crystallinity is preferably at least 10 percent by weight, more preferably at least 20 percent by weight, and still more preferably at least 25 percent by weight, though depending upon the application field of the PEEK membrane. The crystallinity of the PEEK membrane in the present invention is expressed by the ratio of the crystallized component to the total of the PEEK membrane on a weight basis and is measured according to the wide-angle X-ray diffractometry reported by Blundell and Osborn (Polymer, 24, 953, 1983).

The PEEK membrane obtained according to the present invention is excellent in chemical resistance despite being manufactured by using sulfuric acid and, for example, can be used in an acid or alkaline solvent or even in a polar organic solvent. If the crystallinity of the PEEK membrane is increased by the aforesaid heat treatment, not only is the chemical resistance further improved but also the mechanical strength, for example, tensile strength and bursting strength are enhanced remarkably. Furthermore, regarding heat resistance, the PEEK membrane thus treated has excellent heat stability in water of 100 degrees C and even in water having temperatures exceeding 150 degrees C.

Because membrane formation is performed with the use of concentrated sulfuric acid highly capable of dissolving PEEK, it is possible to control the fractionating and water permeability characteristics throughout a wide range and to prepare both an asymmetric membrane having the surface and inner regions with differing pore sizes and a symmetric membrane having pores uniform in size throughout the whole thereof, depending upon the composition of the membrane forming stock solution and the coagulation conditions thereof.

The PEEK membrane obtained according to the present invention may contain a hygroscopic polymer such as polyvinyl pyrrolidone or the like or further crosslink therewith to such an extent that it has no influence on the properties of the PEEK membrane such as heat resistance and the like.

The form of the PEEK membrane prepared according to the present invention is not especially restricted but is preferably that of a hollow fiber. In this case, the wall thickness of the hollow fiber is not particularly restricted but ranges generally from 5 to 3,000 μm and particularly preferably from 10 to 1,000 μm. The outside diameter of the said hollow fiber is not especially limited, but ranges generally from 10 to 10,000 μm and particularly preferably from 300 to 5,000 μm.

BEST MODE FOR CARRYING OUT THE INVENTION

Hereinbelow, the present invention will be described in more detail with reference to the following examples, but they should not be construed to limit the scope of the present invention.

First, descriptions will be given on the measuring methods to be adopted in the following examples and comparative examples.

(1) Method of measuring ion exchange capacity

Five grams of sodium chloride is dissolved in distilled water so as to obtain 100 ml of an aqueous sodium chloride solution, in which 0.1 g of a PEEK membrane is immersed. After agitation for two hours at room temperature, the membrane is taken out therefrom and the said sodium chloride solution is titrated with a 0.025 N aqueous sodium hydroxide solution. On the other hand, the membrane thus taken out is immersed in 50 ml of 0.1 N sulfuric acid and allowed to stand for two hours at room temperature. The said membrane is taken out from the sulfuric acid and is dried under vacuum at 50 degrees C for ca. 24 hours after being washed with pure water until it is neutralized in order to measure the weight of the membrane. Based upon the titer and the weight of the membrane obtained in the abovementioned method, the ion exchange capacity of the PEEK membrane is calculated according to the following formula:

ion exchange capacity (meq/g)=titer (ml)×0.025÷membrane weight (g)

Provided that the ion exchange capacity of the membrane is less than 0.1 meq/g, the measurement is made by increasing the weight of the membrane or the sodium ion absorbed in the above-mentioned method is measured by means of absorption spectroscopy.

(2) Water permeability

If the form of the membrane is that of a flat-sheet membrane, the flat-sheet membrane is placed in a plastic filter holder (Trade name: PP-25, a product of Advantec Toyo, Co., Ltd.) and 25 degree C distilled water is passed through the membrane at a pressure of 1 kg/cm$^2$ from the side exposed to a coagulation liquid at the time of membrane formation to measure the volume of the distilled water passed therethrough for 20 minutes. Water permeability is expressed as flux by calculating the said volume in terms of l/m$^2$·hr·kg/cm$^2$. Further, if the form of the membrane is that of a hollow fiber, 25 degree C distilled water is injected at a pressure of 1 kg/cm$^2$ into the bore of a 30-cm long hollow fiber whose one end is sealed to measure the volume of the distilled water permeated through the wall of the hollow fiber for 20 minutes. Water permeability is expressed as flux by calculating the said volume in terms of l/m$^2$·hr·kg/cm$^2$.

(3) Method of measuring the hollow fiber membrane rejection ratio of dextran molecules Dextran (a product of Pharmacia) having a weight average molecular weight of 10,000 is added to distilled water to prepare a feed dextran solution so that it may have a concentration of 0.5 percent by weight. The said feed solution is injected through the bore of a hollow fiber membrane having a length of 30 cm at a temperature of 25 degrees C, a linear rate of 1 m/sec. and an average filtration pressure of 1 kg/cm$^2$ for 10 minutes to obtain a filtrate through the wall of the hollow fiber membrane. The rejection ratio of the hollow fiber membrane is obtained from the following formula:

rejection ratio (%)=(1−C/C$_0$)×100 wherein C and C$_0$ indicate the respective concentrations of the obtained filtrate and the feed dextran solution.

(4) Method of measuring the hollow fiber membrane rejection ratio of polystyrene latex particles Polystyrene latex (a product of Seradyn, Inc.) having a particle size of 0.212 μm is added to distilled water to prepare a feed suspension so that it may have a concentration of 200 ppm. The rejection ratio is obtained according to the same filtration and calculation methods as in the aforesaid dextran case.

(5) Method of measuring the crystallinity of hollow fiber membrane

By use of X-ray diffraction equipment (MXP-18, a product of MAC Science Co.,Ltd.), the X-ray obtained from a Cu target with an acceleration voltage of 50 kV and acceleration current of 200 mA is made monochromic with an Ni monochrometer. Specimens are placed on a fiber sample table and subjected to measurement by means of penetration. The scattered X-ray from each specimen is scanned in the range of 12° to 32° and 50 points are adopted per 1° and the measurement is performed for 1.2 seconds per point.

EXAMPLE 1

Ten grams of PEEK comprising the repeating units represented by Formula (1) of Group 1 (a product of ICI, VICTREX PEEK 450G) ground into particles of ca. 0.3 mm in diameter was added to 90 grams of 97.5% concentrated sulfuric acid (a product of Kanto Chemical Co., Inc.) at 10 degrees C and was uniformly dissolved therein in a closed system while the temperature was being kept at 10 degrees C to prepare a membrane forming stock solution. The stock solution was deaerated under vacuum while the temperature was being kept at 10 degrees C. The time required for the dissolution and deaeration totaled 4 hours.

The membrane forming stock solution was cooled to 5 degrees C immediately after the deaeration and was allowed to be left for 40 hours.

The stock solution thus prepared was applied to a glass plate to provide a thickness of 100 μm on the glass plate and was consecutively immersed and coagulated in 23 degree C distilled water, in which it was allowed to stand for 5 minutes. The resulting membrane was thereafter taken out from the water, immersed in running water for 1 hour and soaked in ethanol for 2 hours to wash away the residual sulfuric acid remaining in the membrane.

The PEEK flat-sheet membrane thus obtained had an ion exchange capacity of 0.07 meq/g and was not sulfonated substantially. The flux of the membrane was 170 l/m$^2$·hr·kg/cm$^2$ Further, as a result of observing the surface and cross-section of the membrane at a magnification of 10,000 times with a scanning electron microscope, it was found that the membrane was asymmetrical in structure, having a surface with no open pores, a tight skin layer in the neighborhood of the surface and internal voids which became larger gradually as they went inwards.

EXAMPLE 2

Ten grams of PEEK comprising the repeating units represented by Formula (1) of Group 1 (a product of ICI, VICTREX PEEK 450G) ground into particles of ca. 1 mm in diameter was added to 90 grams of 94.5% concentrated sulfuric acid (a product of Kanto Chemical Co., Inc.) at 18 degrees C and was uniformly dissolved therein in a closed system while the temperature was being kept at 10 degrees C to prepare a membrane forming stock solution. The stock solution was deaerated under vacuum while the temperature was being kept at 10 degrees C. The time required for the dissolution and deaeration totaled 5 hours.

The membrane forming stock solution was cooled to 5 degrees C immediately after the deaeration and was allowed to stand for 50 hours.

The stock solution thus prepared was applied to a glass plate to provide a thickness of 100 μm on the glass plate and was consecutively immersed and coagulated in 60% sulfuric acid of 23 degrees C, in which it was allowed to be left for 5 minutes. The resulting membrane was thereafter taken out from the sulfuric acid, immersed in running water for 1 hour and soaked in ethanol for 2 hours to wash away the sulfuric acid remaining in the membrane.

The PEEK flat-sheet membrane thus obtained had an ion exchange capacity of 0.04 meq/g and was not sulfonated substantially. The flux of the membrane was 350 l/m$^2$·hr·kg/cm$^2$. Further, as a result of observing the surface and cross-section of the membrane at a magnification of 10,000 times with a scanning electron microscope, it was found that the membrane was asymmetrical in structure, having a surface with no open pores, a tight skin layer in the vicinity of the surface and internal voids which became larger gradually as they went inwards.

EXAMPLE 3

Ten grams of PEEK comprising the repeating units represented by Formula (1) of Group 1 (a product of ICI, VICTREX PEEK 450G) ground into particles of ca. 0.3 mm in diameter was added to 90 grams of 97.5% concentrated sulfuric acid (a product of Kanto Chemical Co., Inc.) at 6 degrees C, and 3 grams of polyvinyl pyrrolidone (weight average molecular weight: 10,000, a product of Kishida Chemical Co., Ltd.) was further added thereto. They were uniformly dissolved therein in a closed system while the temperature was being kept at 6 degrees C to prepare a membrane forming stock solution. The stock solution was deaerated under vacuum while the temperature was being kept at 6 degrees C. The time required for the dissolution and deaeration totaled 10 hours.

The membrane forming stock solution was cooled to 3 degrees C immediately after the deaeration and was allowed to stand for 20 days.

The stock solution thus prepared was applied to a glass plate to provide a thickness of 100 μm thereon and immediately immersed and coagulated in 60% sulfuric acid of 23 degrees C, in which it was allowed to be left for 10 minutes therein. The resulting membrane was thereafter taken out from the sulfuric acid, immersed in running water for 1 hour and soaked in ethanol for 2 hours to wash away the sulfuric acid remaining in the membrane. Further, by immersing the membrane in a 25° C. aqueous solution of 3,000 ppm sodium hypochlorite for 20 hours, residual polyvinyl pyrrolidone was removed therefrom.

The PEEK flat-sheet membrane thus obtained had an ion exchange capacity of 0.04 meq/g and was not sulfonated substantially. The flux of the membrane was 980 l/m$^2$·hr·kg/cm$^2$. Further, as a result of observing the surface and cross-section of the membrane at a magnification of 10,000 times with a scanning electron microscope, it was found that the membrane was asymmetrical in structure, having a surface with no open pores, a tight skin layer in the neighborhood of the surface and internal voids which became larger gradually as they went inwards.

COMPARATIVE EXAMPLE 1

Ten grams of PEEK comprising the repeating units represented by Formula (1) of Group 1 (a product of ICI, VICTREX PEEK 450G, particle size: ca. 4 mm) was added to 90 grams of 97.5% concentrated sulfuric acid (a product of Kanto Chemical Co., Inc.) at 25 degrees C and was uniformly dissolved therein in a closed system while the temperature was being kept at 25 degrees C to prepare a membrane forming stock solution. The stock solution was deaerated under vacuum while the temperature was being kept at 25 degrees C. The time required for the dissolution and deaeration totaled 4 hours.

After the deaeration, the membrane forming stock solution was allowed to stand for 20 hours, while it was being kept at a temperature of 25 degrees C.

The stock solution thus prepared was applied to a glass plate to provide a thickness of 100 μm on the glass plate and immediately immersed and coagulated in 23 degree C distilled water, in which it was allowed to be left for 5 minutes. The resulting membrane was thereafter taken out from the water, immersed in running water for 1 hour and soaked in ethanol for 2 hours to wash away the sulfuric acid remaining in the membrane.

The membrane thus obtained swelled when immersed in ethanol. Further, the said membrane was swelled and intensively deformed in boiling water.

The PEEK flat-sheet membrane obtained in this comparative example had an ion exchange capacity of 0.7 meq/g and was sulfonated substantially.

COMPARATIVE EXAMPLE 2

Ten grams of PEEK comprising the repeating units represented by Formula (1) of Group 1 (a product of ICI, VICTREX PEEK 450G, particle size: ca. 4 mm) was added to 90 grams of 97.5% concentrated sulfuric acid (a product of Kanto Chemical Co., Inc.) at 25 degrees C and was uniformly dissolved therein in a closed system while the temperature was being kept at 25 degrees C to prepare a membrane forming stock solution. The stock solution was deaerated under vacuum while the temperature was being kept at 25 degrees C. The time required for the dissolution and deaeration totaled 4 hours.

After the deaeration, the membrane forming stock solution was allowed to stand for 20 days while the stock solution was being kept at 18 degrees C.

The stock solution thus prepared was applied to a glass plate to provide a thickness of 100 μm on the glass plate and was immediately immersed and coagulated in 23 degree C distilled water, in which it was allowed to be left therein for 5 minutes. The resulting membrane was then taken out from the water and immersed in running water for 1 hour.

The obtained membrane had an ion exchange capacity of 1.4 meq/g and was sulfonated substantially. As soon as the said membrane was immersed and washed in ethanol, it dissolved therein.

EXAMPLE 4

One hundred grams of PEEK comprising the repeating units represented by Formula (1) of Group 1 (a product of ICI, VICTREX PEEK 450G) ground into particles of ca. 0.3 mm in diameter was added to 900 grams of 97.5% concentrated sulfuric acid (a product of Kanto Chemical Co., Inc.) at 10 degrees C and was uniformly dissolved therein in a closed system while the temperature was being kept at 10 degrees C to prepare a membrane forming stock solution. The stock solution was deaerated under vacuum while the temperature was being kept at 10 degrees C. The time required for the dissolution and deaeration totaled 10 hours.

Immediately after the deaeration, the membrane forming stock solution was cooled to 6 degrees C.

The stock solution, of which the temperature was kept at 6 degrees C, was extruded through a tube-in-orifice type spinneret for hollow fiber spinning at a flow rate of 6 ml/min., while 25° C. water was being injected as a coagulant through the bore at the same time. The solution thus extruded was immersed in a 24° C. water bath underlaid 9 cm below the spinneret and was wound after coagulation. About 80 minutes was required for the spinning from the beginning to the end.

The wound hollow fiber membrane was washed by immersing it in 25° C. running water for 10 hours and then in 25° C. ethanol for 10 hours.

The portion of the hollow fiber membrane wound immediately after the beginning of the spinning had an ion exchange capacity of 0.02 meq/g, while the other portion of the hollow fiber membrane wound in the neighborhood of the end of the spinning had also an ion exchange capacity of 0.02 meq/g. Thus, the PEEK hollow fiber membrane could be obtained by spinning without substantial sulfonation.

The resulting hollow fiber membrane was heat treated, without being dried, in 90 degree C triethylene glycol for 1 hour and further in 200 degree C triethylene glycol for 1 hour. After this treatment, the PEEK hollow fiber membrane was immersed in 25 degree C ethanol to remove residual triethylene glycol therefrom and was kept in water.

The PEEK hollow fiber membrane thus obtained had a flux of 48 $l/m^2 \cdot hr \cdot kg/cm^2$, crystallinity of 24 percent measured by the wide-angle X-ray diffraction analysis and a dextran rejection ratio of 92 percent.

The said membrane was excellent in heat resistance without showing any change in appearance and water permeability even if immersed in 130 degree C water for 10 hours.

EXAMPLE 5

One hundred grams of PEEK comprising the repeating units represented by Formula (1) of Group 1 (a product of ICI, VICTREX PEEK 450G) ground into particles of ca. 0.3 mm in diameter was added to 900 grams of 97.5% concentrated sulfuric acid (a product of Kanto Chemical Co., Inc.) at 8 degrees C, and 30 grams of polyvinyl pyrrolidone (weight average molecular weight: 10,000, a product of Kishida Chemical Co., Ltd.) was further added thereto. They were uniformly dissolved therein in a closed system while the temperature was being kept at 8 degrees C to prepare a membrane forming stock solution. The stock solution was deaerated under vacuum while the temperature was being kept at 8 degrees C. The time required for the dissolution and deaeration totaled 15 hours.

Immediately after the deaeration, the membrane forming stock solution was cooled to 3 degrees C.

The membrane forming stock solution, of which the temperature was kept at 3 degrees C, was extruded through a tube-in-orifice type spinneret at a flow rate of 6 ml/min., while 25° C. water was being injected as an inside coagulant into the bore at the same time. The stock solution thus extruded was immersed in a 24° C. water bath underlaid 9 cm below the spinneret and was wound after it coagulated. About 90 minutes was required for spinning from the beginning to the end.

The wound hollow fiber membrane was washed by immersing it in 25° C. running water for 10 hours and then in 25° C. ethanol for 10 hours. It was further rinsed by immersing it in a 26° C. aqueous solution of sodium hypochorite having a concentration of 3,000 ppm for 20 hours.

The portion of the hollow fiber membrane wound immediately after the beginning of the spinning had an ion exchange capacity of 0.01 meq/g, while the other portion of the hollow fiber membrane wound near the end of the spinning also had an ion exchange capacity of 0.01 meq/g. Thus, the PEEK hollow fiber membrane could be spun without being sulfonated substantially.

The obtained hollow fiber membrane, without being dried, was heat treated in 90° C. triethylene glycol for 1 hour and further heat treated in 200° C. triethylene glycol for 1 hour. After this treatment, the PEEK hollow fiber membrane was immersed in 25° C. ethanol to remove residual triethylene glycol therefrom and was thereafter kept in water.

The PEEK hollow fiber membrane thus obtained had a flux of 80 $l/m^2 \cdot hr \cdot kg/cm^2$, crystallinity of 24 percent measured by the wide-angle X-ray diffraction analysis and a dextran rejection ratio of 92 percent.

Measured under the condition of a 5 cm distance between grips, 50 mm/min. grip separation speed and 25 degrees C, the tensile strength of the PEEK hollow fiber membrane was found to be 68 $kg/cm^2$.

EXAMPLE 6

One hundred grams of PEEK comprising the repeating units represented by Formula (1) of Group 1 (a product of ICI, VICTREX PEEK 450G) ground into particles of ca. 0.3 mm in diameter was added to 900 grams of 97.5% concentrated sulfuric acid (a product of Kanto Chemical Co., Inc.) at 10 degrees C, and 30 grams of polyvinyl pyrrolidone (weight average molecular weight: 10,000, a product of Kishida Chemical Co., Ltd.) was further added thereto. They were uniformly dissolved therein in a closed system while keeping the temperature at 10 degrees C to prepare a membrane forming stock solution. The stock solution was deaerated under vacuum while keeping the temperature at 10 degrees C. The time required for the dissolution and deaeration totaled 10 hours.

Immediately after the deaeration, the membrane forming stock solution was cooled to 3 degrees C.

The stock solution, of which the temperature was kept at 3 degrees C, was extruded through a tube-in-orifice type spinneret at a flow rate of 6 ml/min., while passing 25° C. 50% sulfuric acid as an inside coagulant through the bore. The stock solution thus extruded was immersed in a 24° C. water bath underlaid 5 cm below the spinneret and was wound after it coagulated. About 90 minutes was required for spinning from the beginning to the end.

The wound hollow fiber membrane was washed by immersing it in 25° C. running water for 10 hours and further immersing in 25° C. ethanol for 10 hours. The membrane was thereafter rinsed by immersing it in a 26° C. aqueous solution of sodium hypochorite having a concentration of 3,000 ppm for 20 hours.

The portion of the hollow fiber membrane wound immediately after the beginning of the spinning had an ion exchange capacity of 0.02 meq/g, while the other portion of the hollow fiber membrane wound near the end of the spinning also had an ion exchange capacity of 0.02 meq/g. Therefore, the PEEK hollow fiber membrane could be spun without being sulfonated substantially.

The PEEK hollow fiber membrane thus obtained had a flux of 240 $l/m^2 \cdot hr \cdot kg/cm^2$ and a dextran rejection ratio of 72 percent.

COMPARATIVE EXAMPLE 3

The membrane forming stock solution prepared and kept in the same manner as in Comparative example 1 was spun into a hollow fiber membrane in the same way as in Example 6.

The obtained hollow fiber membrane had an ion exchange capacity of 0.84 meq/g. Its tensile strength was measured as in Example 5 and resulted in a value of 21 kg/cm². The membrane was clearly inferior in tensile strength to that obtained in Example 5.

Industrial Applicability

In accordance with the present invention it is possible to advantageously obtain a polyether ether ketone membrane by using sulfuric acid which is easy to handle and available at low prices generally from a commercial viewpoint, instead of using organic acids or hydrofluoric acid in its preparation. The PEEK membrane obtained by the production process of the present invention is excellent in mechanical strength and heat and chemical resistance and has low elution characteristics. Further, the use of sulfuric acid which is highly effective in dissolving PEEK, makes it possible to control membrane performance throughout a wide range, so that a membrane having an excellent balance of water permeability and fractionating characteristics can be obtained.

For the above reasons, the PEEK membrane of the present invention may be advantageously employed for filtration in the preparation of ultrapure water for semiconductors in the electronic industry and for filtration in the fields of medical appliances, pharmaceuticals and foods. Further, the PEEK membrane of the present invention may also be advantageously employed for severe use in stable filtration for a long term at high temperatures exceeding 100 degrees C, if the crystallinity of the membrane is heightened by the heat treatment wherein a heat stabilizing solvent is used.

What is claimed is:

1. In a process for preparing a polyether ether ketone membrane which comprises dissolving polyether ether ketone in a solvent to obtain a membrane forming stock solution, forming the solution into a predetermined shape and bringing the formed solution into contact with a coagulation liquid capable of coagulating said ketone, the improvement which comprises (a) using concentrated sulfuric acid as solvent;

(b) after dissolving said ketone in the solvent, maintaining the resulting stock solution at 15 degrees C or lower; and then (c) contacting the stock solution with the coagulation liquid, whereupon initiation of the membrane formation occurs, said polyether ether ketone membrane having an ion exchange capacity of 0.005 to 0.5 meq/g.

2. The process according to claim 1, wherein the concentration of concentrated sulfuric acid is 94 percent or more.

3. The process according to claim 1, wherein the membrane forming stock solution contains a thickening agent.

4. The process according to claim 3, wherein the thickening agent is polyvinyl pyrrolidone or polyethylene glycol.

5. The process according to claim 1, wherein said ketone is dissolved in the solvent at a temperature of 15 degrees C or lower.

6. The process according to claim 1, wherein the coagulation liquid is water or sulfuric acid having a concentration lower than 70 percent.

7. The process according to claim 6, wherein the coagulation liquid contains a water-soluble organic solvent.

8. The process according to claim 1, wherein the coagulation liquid is a water-soluble organic solvent.

9. The process according to claim 1, wherein after membrane formation the membrane is subjected to heat treatment by using a heat stabilizing solvent under a wet condition at temperatures between the glass transition point and the melting point of said ketone.

10. The process according to claim 9, wherein the temperature of the heat treatment ranges from 150 to 320 degrees C.

11. A polyether ether ketone membrane obtained by the process of claim 10.

12. The process according to claim 9, wherein the solubility parameter of the heat stabilizing solvent ranges from 7 to 17.

13. A polyether ether ketone membrane obtained by the process of claim 1.

* * * * *